United States Patent [19]

Nozik

[11] 3,811,953

[45] May 21, 1974

[54] LIGHT-TRANSMITTING ELECTRICALLY CONDUCTING CADMIUM STANNATE AND METHODS OF PRODUCING SAME

[75] Inventor: Arthur Jack Nozik, Westport, Conn.

[73] Assignee: American Cyanamid Company, Stamford, Conn.

[22] Filed: Sept. 20, 1971

[21] Appl. No.: 181,916

[52] U.S. Cl. .................... 136/89, 29/572, 204/129, 252/62.3 BT, 252/62.3 R, 423/593, 432/618

[51] Int. Cl. .... C01g 11/00, B01k 1/00, H01l 15/02

[58] Field of Search ............ 136/89; 423/593, 618; 219/572; 204/192; 252/62.3 BT, 62.3 R

[56] References Cited

UNITED STATES PATENTS

| | | | |
|---|---|---|---|
| 2,658,833 | 11/1953 | Coffeen et al. | 423/593 X |
| 2,883,305 | 4/1959 | Auwarter | 204/192 X |
| 3,416,044 | 12/1968 | Dreyfus et al. | 29/572 X |
| 3,420,726 | 1/1969 | Hefflewhite et al. | 252/62.3 BT UX |
| 3,437,577 | 4/1969 | Kay et al. | 204/192 |
| 3,483,110 | 12/1969 | Rozgonyi | 204/192 |
| 3,628,017 | 12/1971 | Lerner | 136/89 X |
| 3,630,873 | 12/1971 | Moore et al. | 204/298 X |

FOREIGN PATENTS OR APPLICATIONS

| | | | |
|---|---|---|---|
| 799,222 | 8/1958 | Great Britain | 204/192 |
| 887,548 | 6/1959 | Great Britain | 204/192 |

OTHER PUBLICATIONS

Chem. Abs. 1953, 8981g "Ceramic & Dielectric Properties of the Stannates" W. Coffeen.

Chem. Abs. Vol. 67, 1967 pp. 1510, 15815b "Crystal Structures of $Ca_2SnO_4$ and $Cd_2SnO_4$ "M. Iroemel.

*Primary Examiner*—A. B. Curtis
*Attorney, Agent, or Firm*—Roland A. Dexter

[57] ABSTRACT

Cadmium stannate ($Cd_2SnO_4$) is shown to provide a light-transmitting electrically conducting composition in which the electrical conductivity can be varied from $10^{-7}$ ohm$^{-1}$cm$^{-1}$ to $10^4$ ohm$^{-1}$cm$^{-1}$ by controlling the oxygen vacancy concentration of the material. Amorphous and crystalline films of $Cd_2SnO_4$ can be disposed on cold and/or hot substrates and they exhibit high optical transparency as well as high electrical conductivity. Other useful forms and configurations of semiconducting $Cd_2SnO_4$ are disclosed.

21 Claims, 2 Drawing Figures

PATENTED MAY 21 1974 3,811,953

INVENTOR.
ARTHUR JACK NOZIK
BY Roland A. Depter
ATTORNEY

LIGHT-TRANSMITTING ELECTRICALLY CONDUCTING CADMIUM STANNATE AND METHODS OF PRODUCING SAME

This invention relates to light-transmitting electrically conducting compositions of matter and methods of producing such compositions and controlling the electrical and optical properties thereof. More particularly, it relates to cadmium stannate ($Cd_2SnO_4$) in the form of an n-type defect semiconductor which contains oxygen vacancies within a wide range of concentrations and is semiconducting in both its amorphous and crystalline forms. Still more particularly the invention relates to the discovery that both the transparency and the conductivity of cadmium stannate is a function of the oxygen vacancy concentration of the solid material. The invention relates still further to optoelectronic devices such as solar cells, electroluminescent panels, photoconductors, photodectors, and liquid crystal displays which feature cadmium stannate as a transparent electrically conducting film having excellent light and chemical stability.

High conductivity and high optical transmission are incompatable insofar as, other things being equal, the former calls for thickness and the latter for thinness of the material. In general, the highest conductivity is possessed by metals which, if sufficiently thin, are also transparent. However, practical tests show that metallic films have much lower conductivities and lower optical transmission than is to be expected from the bulk values of their conductivity and optical constants. Certain semiconducting oxides, such as stannic oxide and indium oxide have also been used as transparent conductors. Unfortunately, however, these materials must be applied to hot substrates (400° 14 600°C) or, subsequent to formation, heat treated at high temperatures in order to render them sufficiently conductive. Furthermore, the optical transmission and related electrical conductivity of these oxides cannot be made sufficiently high to be useful in many practical applications.

It is the general object of this invention to avoid and overcome the foregoing and other difficulties and objections to prior art practices by the provision of a new and novel lighttransmitting, electrically conducting material which has both a high degree of transparency and a relatively high electrical conductivity.

It is another object to provide light transmitting electrically conducting elements which are very tough, hard and stable to radiation and high temperatures.

It is another object to provide light transmitting electrically conducting elements which can be deposited on a cold substrate, including heat sensitive surfaces such as plastic.

Other objects, features and advantages of this invention will become more apparent from the following description of preferred embodiments thereof and from the drawings in which.

Figure 1:
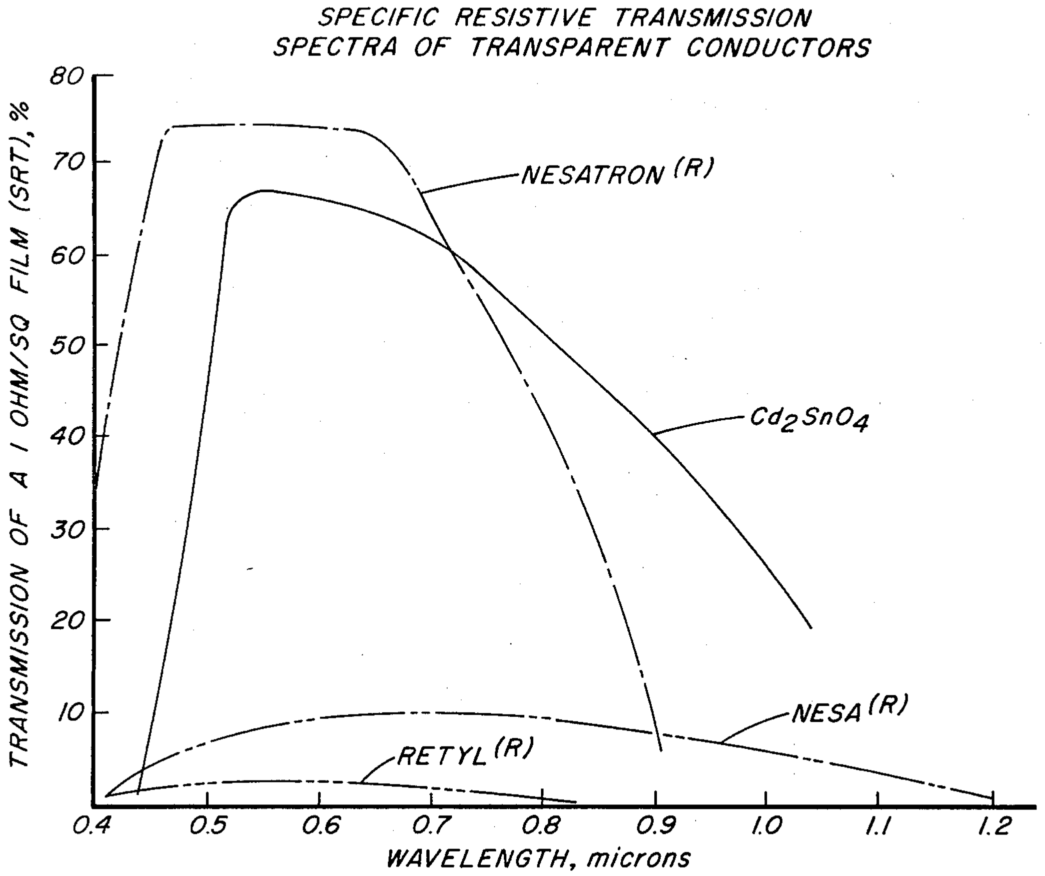
FIG. 1 is a graph showing a comparison between the electro-optical characteristics of three commercially available transparent conductors and a film of cadmium stannate.

According to this invention, it has been discovered that cadmium stannate is an improved light-transmitting electrically conducting material.

$Cd_2SnO_4$ was first prepared as a powder by A. J. Smith (Acta Cryst. 13, 749 (1960)) who simply reported its crystal structure as orthorhombic and presented powder diffraction data. M. Hassanein (J. Chem. U.A.R. 9, 275 (1966)) later repeated this preparation. Both authors believed $Cd_2SnO_4$ to be a simple stoichiometric compound, implying it to be an insulator.

However, cadmium stannate, has been unexpectedly found to be an n-type defect semiconductor with a conductivity arising from the presence of donor states in the form of oxygen vacancies in the macromolecular structure which are compensated by electrons to maintain overall charge neutrality in the solid. These electrons are readily promoted to the conduction band by thermal excitation and thereby provide the free charge carriers necessary for the conduction process. The conductivity of $Cd_2SnO_4$ can be varied from about $10^{7-}ohm^{-1}cm^{-1}$ to about $10^4 ohm^{-1}cm^{-1}$ by adjustment of oxygen vacancy concentration. Although pure cadmium stannate is normally n-type conducting, it is possible to prepare the p-type semiconducting form of cadmium stannate by doping the material with an acceptor species of sufficient concentration to completely compensate the donor states and provide an excess of acceptor states.

The oxygen vacancy concentration, which is directly related to the conductivity of cadmium stannate, can be readily predetermined according to the teaching of the present invention, by controlling the atmosphere in which the cadmium stannate is made and the thermal treatment it receives during preparation. High oxygen vacancy concentrations, i.e. $10^{18}$ to $10^{21}cm^{-3}$ and correspondingly high conductivities, i.e. 1 to $10^4 ohm^{-1}cm^{-1}$ may be attained by preparing the compound in an oxygen deficient environment, or by heating cadmium stannate in a reducing atmosphere. If lower conductivities, i.e., $10^{-7}$ to 1 $ohm^{-1}cm^{-1}$ are desired, the cadmium stannate is prepared in an oxygen-rich environment, such as pure oxygen or air, and is thereafter slow cooled from its reaction temperature.

A very important discovery concerning the optical properties of cadmium stannate is the large Burstein shift (E. Burstein, Phys. Rev. 93, 632(1954)) in the optical absorption spectra of conductive samples. This effect occurs in cadmium stannate because of the unusually low effective mass of its conduction electrons. This means that in its minimum region the conduction band of cadmium stannate has a high curvature and a low density of states. Consequently, the conduction band becomes degenerate at a relatively low free carrier density, and the states at the bottom of the conduction band become filled up. Optical transitions which occur in this system must thus proceed at higher energy than that indicated by the intrinsic band gap. The net result of this condition is that the fundamental optical absorption edge is shifted toward shorter wavelengths with increasing free carrier density.

For $Cd_2SnO_4$, the effective mass was measured to be about 0.04 of that of a free electron, and its intrinsic optical band gap was measured to be 2.06 eV (6020 A).

The low value of the effective mass of $Cd_2SnO_4$ leads to high electronic mobilities which were measured in amorphous films and found to range from 5 to 150 $cm^2$ $(volt\text{-}second)^{-1}$.

With increasing oxygen vacancy concentration and conductivity, the optical absorption edge of $Cd_2SnO_4$ shifts toward the ultra-violet, so that, for example, when the conductivity reaches $400 ohm^{-1}cm^{-1}$, the apparent optical band gap is 2.85 eV (4,350 A). Thus, by increasing the free carrier density of cadmium stannate it becomes not only more conductive but also more transparent. In general, this process is limited by the effects of free carrier absorption in the infra-red region. At high free carrier densities, the free carrier absorption can become significant and tail into the visible and near infra-red regions, reducing transparency. However, this effect is moderate in cadmium stannate so that high conductivities and large Burstein shifts can be attained without the accompanying excessive visible and near infra-red optical absorption due to the increase in free carrier density.

Another unique feature of cadmium stannate is that all of the excellent optical and electical properties described herein can be achieved with both amorphous and crystalline forms of material. This contrasts with most semiconducting materials wherein high electrical conductivity and mobility are possible only with the crystalline form.

Amorphous films of cadmium stannate have been found to be particularly useful when disposed on a supporting transparent substrate. Unlike any of the commercially known transparent conductors, these films are very tough, hard and stable against ionizing radiation and to temperatures of up to 700°C. They can, furthermore, be deposited on a cold substrate, including heat sensitive surfaces such as plastic. None of the commercially known conductive and transparent coating compositions possess this unique combination of features. For example, stannic oxide or indium oxide coatings on glass must be crystallized by heat treatment at about 400° to 600°C. in order to be rendered conductive.

The crystalline forms of the material of the present invention are also very useful for a variety of devices and applications. For example, semiconducting cadmium stannate can be used as active components in p-n junction devices such as diodes, transistors, lasers, and solar cells, or in bulk-effect devices such as photoconductors, Hall devices, and thermistors. Furthermore, microcrystalline powders of conductive cadmium stannate can be used as conductive pigments. In this form, the color of the conductive cadmium stannate powder is green, due to its optical scattering and absorption characteristics.

Previously, only the orthorhombic crystalline phase of cadmium stannate, formed between 900° and 1,500°C, had been known. However, a new crystalline phase of cadmium stannate having a cubic spinel structure has now been discovered, which is formed between 700° and 900°C. Crystalline films of cadmium stannate can be formed by heat treating amorphous films at temperatures above about 700°C., or by depositing cadmium stannate films on suitable substrates maintained above about 425°C.

The improved light-transmitting, electrically conducting material of this invention has utility with any device wherein such material is required, examples being electroluminescent devices, photoconducting devices, liquid crystal displays and plastic substrates which are required to be electrically heated in order to dispel fogging. The invention has particular utility with respect to solar cell devices, however, and it has been so illustrated and will be so described.

Turning now to the drawings, FIG. 1 is an evaluation of cadmium stannate as a transparent conductor employing a figure of merit which is labeled "specific resistive transmittance" (SRT). This figure is defined as the transmittance of a film with a sheet resistance of 1 ohm/square. Since $$T = I/I_o = \exp[-\alpha t]$$

and $$R = 1/\sigma A$$

where

| | |
|---|---|
| T = transmittance | $\alpha$ = optical absorption coefficient in $cm^{-1}$ |
| $I_o$ = initial light intensity | t = film thickness in cm |
| I = final light intensity | $\sigma$ = conductivity in $ohm^{-1} cm^{-1}$ |
| R = resistance in ohms | |
| l = length in cm | A = area in $cm^2$ |

it can be easily shown that for a square conductor $$R = 1/\sigma t$$

$$T = \exp[-\alpha/\sigma R]$$

so that $$SRT = \exp[-\alpha/\sigma]$$

The SRT spectra of FIG. 1 were calculated from electrical and optical data obtained from amorphous $Cd_2SnO_4$ films supported on glass substrates and from three samples of commercial transparent conductors. These commercial materials were: NESA, a stannic oxide commercially available from PPG Industries; RETYL, a stannic oxide commercially available from Corning Glass; and NESATRON, an indium oxide commercially available from PPG Industries. As tested, all commercial samples consisted of crystalline films deposited on glass substrates.

It is clearly evident from FIG. 1 that cadmium stannate is a much better transparent conductor than stannic oxide (NESA or RETYL). Indium oxide (NESATRON) is somewhat better than cadmium stannate in the visible and especially in the blue, but cadmium stannate is superior to indium oxide in the near infrared.

The various forms of $Cd_2SnO_4$ may be prepared by a variety of procedures. A satisfactory method involves reacting cadmium oxide powder and stannic oxide powder in a molar ratio of two to one at a temperature ranging from 700° to 1,150°C. for from ½ hour to 24 hours. A preferred condition is at 1,050°C. for about 5 hours. Intimate mixing of the powders prior to reaction yields a polycrystalline powder of $Cd_2SnO_4$. Large single crystals of $Cd_2SnO_4$ are obtained by placing the reactants in non-admixed contiguous relationship while covered with $CdCl_2 \cdot 2\frac{1}{2} H_2O$ (see following Example 4).

The conductivity of the various forms may be determined by both controlling the atmosphere of the reaction and a subsequent thermal treatment of the reaction product. A material having a high electrical conductivity ranging from 1 to $10^4 ohm^{-1}cm^{-1}$ may be obtained by reacting the starting materials in a vacuum and rapidly quenching the product. If $Cd_2SnO_4$ of moderate conductivity, i.e., from 0.1 to 0.5 $ohm^{-1}cm^{-1}$, is desired, the reaction is carried out in air and the product air quenched. A product exhibiting lower conductivity values, e.g., ranging from $10^{-1}$ to $10^{-7} ohm^{-1}cm^{-1}$, is obtained by similarly reacting in environments of varying oxygen concentration and slow-cooling the resulting $Cd_2SnO_4$.

Amorphous films of cadmium stannate, according to the present invention, may be prepared by a radio frequency sputtering technique. Typically, one technique involves forming a cadmium stannate target from crystalline cadmium stannate powder having a conductivity ranging from $10^{-3}ohm^{-1}cm^{-1}$ to $10^4ohm^{-1}cm^{-1}$. The target thus formed and a suitable substrate are placed in a standard sputtering chamber, one to three inches apart, while the substrate is maintained at a temperature of less than 425°C. The chamber is provided with an oxygen-argon atmosphere wherein the argon concentration may be varied from 0 to 100 percent and the pressure of the chamber is maintained at about 10 microns. An amorphous film of cadmium stannate may now be deposited on the substrate by radio frequency sputtering at a power level of 50 to 1,000 watts.

As noted above, an amorphous film is obtained with a substrate maintained at a temperature below about 425°C. If the substrate temperature is raised above about 425°C the deposited film of $Cd_2SnO_4$ exhibits crystallinity.

The electrical conductivity and optical characteristics of the resultant film may be predetermined by regulating the atmosphere wherein the sputtering technique is accomplished. A high conductivity ranging from $10^2$ to $10^3ohm^{-1}cm^{-1}$, may be achieved by sputtering in pure argon. At the oxygen concentration of the sputtering atmosphere is increased, the resulting cadmium stannate film has a correspondingly lower conductivity. For instance, a sputtering atmosphere of 50 percent oxygen — 50 percent argon leads to a product having a conductivity of $10^{-1}ohm^{-1}cm^{-1}$ while in a pure oxygen environment decreased conductivities ranging to $10^{-7}ohm^{-1}cm^{-1}$ are produced. In all of these amorphous films useful light transmittance is found to obtain.

The conductivity of the cadmium stannate film produced by the present sputtering technique may be further increased by heating the film at a temperature of 100° to 500°C. in a reducing atmosphere. For instance, if a film having a conductivity of $10^{-1}ohm^{-1}cm^{-1}$ is heat treated at 280°C. in pure hydrogen for 10 minutes, the resulting cadmium stannate film has a conductivity of about 1,350 $ohm^{-1}cm^{-1}$ while markedly increasing its light transmittance in the visible.

Electrically conductive for the pruposes of this disclosure, particularly useful for transparent electrode applications, can be construed as having a conductivity greater than $10^1ohm^{-1}cm^{-1}$ which approximates an oxygen vacancy concentration of about $10^{18}cm^{-3}$.

In certain electronic applications such as for circuitry and associated components (rectifiers, resistors, capacitors, switches, thin film semiconducting devices, etc.), the $Cd_2SnO_4$ film is not required to have light transmittance. In accordance with this invention therefore a thin film of $Cd_2SnO_4$, crystalline and/or amorphous, can be usefully disposed on a supporting member, e.g., insulating plastics, metallic electrodes, and semiconducting bodies, and produce conductivity ranging from $10^{-7}ohm^{-1}cm^{-1}$ to $10^4ohm^{-1}cm^{-1}$ at 25°C.

Figure 2:
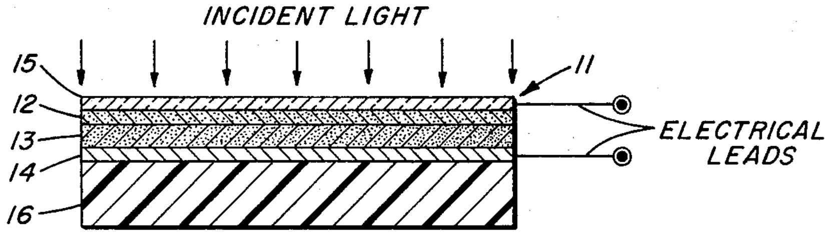
FIG. 2 shows a thin film solar cell device employing cadmium stannate as a transparent electrode.

In FIG. 2, a sectional elevational view of a solar cell device featuring cadmium stannate as the transparent electrode is depicted. The numeral 11 in FIG. 2 indicates generally a solar cell device which comprises a photovoltaic junction formed between an n-type semiconductor 12 and a p-type semiconductor or metal 13 sandwiched between a metallic, opaque back electrode 14 and a light-transmitting electrically coonductive film of cadmium stannate 15, the total structure supported on a substrate 16. The general configuration of the solar cell 11 is conventional. As examples, the junction can be a homojunction between n and p type silicon single crystals. Alternatively, the junction can be a polycrystalline thin film heterojunction formed between n-type CdS and p-type $Cu_2S$ or metallic copper. The back electrode 14 can be comprised of a metallic conductor such as silver, copper, or gold. The supporting substrate can be rigid or a film of flexible plastic, such as polyethylene terephthalate or polyamide and can be disposed on either the front or back electrode. The currently available front electrodes for solar cells consists of fine metallic grids. The replacement of these grids by electrically conducting and light transmitting cadmium stannate amorphous films results in a simpler solar cell design with improved reliability, radiation resistance and efficiency.

Cadmium stannate is superior to other transparent conducting films in this application because of its higher SRT values in the region of the maximum spectral response for the most developed solar cell systems. Table 1 illustrates the range of maximum spectral response for some representative solar cell systems.

Table 1

Maximum Spectral Response of Solar Cells

| Solar Cell Type | Range of Maximum Spectral Response (at least 50% of peak values). |
|---|---|
| Si | 5500 A – 9500 A |
| CdS | 5000 A – 9800 A |
| GaAs | 5500 A – 9000 A |

The following examples illustrating embodiments and applications of the present invention are not to be construed as a limitation on the invention except as defined in the appended claims.

EXAMPLE 1

12.04 grams of high purity $SnO_2$ powder and 20.54 grams of CdO powder are intimately mixed in a mortar and pestle, placed into an evacuated quartz ampoule and sealed. The ampoule is heated at 1,050°C. for 6 hours and quenched in air. The resultant cadmium stannate powder is green in color, orthorhombic in crystalline form, and its conductivity is greater than about 10 $ohm^{-1}cm^{-1}$.

EXAMPLE 2

12.04 grams of high purity $SnO_2$ powder and 20.54 grams of cadmium oxide powder are intimately mixed in a mortar and pestle and placed in an open alumina crucible. The crucible is placed in a muffle furnace and heated in air at 1,050°C. for 6 hours. After this period, the crucible is slowly cooled from 1,050°C. to 500°C. at a rate of about 0.5°C. per minute and cooled from 500°C. to 25°C. at about 10°C. per minute. The resultant cadmium stannate powder is yellow in color, orthorhombic in crystalline form, and its conductivity is about $10^{-2}ohm^{-1}cm^{-1}$.

EXAMPLE 3

The reactants and procedure are the same as Example 2 above except that the reaction is carried out in a 100 percent oxygen atmosphere instead of air. The resultant cadmium stannate microcrystalline powder is orthorhombic in form and has a conductivity of less than about $10^{-3}$ohm$^{-1}$cm$^{-1}$.

EXAMPLE 4

1.40 grams of CdO and 2.38 grams of $SnO_2$ are placed in separate piles on the bottom of a 100 ml. $Al_2O_3$ crucible. 67.2 grams of $CdCl_2 \cdot 2H_2O$ are placed on top of the CdO and $SnO_2$. The crucible is placed in a muffle furnace which is provided with a flowing oxygen atmosphere and kept at 800°C. for 12 hours. The crucible is removed and immediately immersed in 1,000ml of $H_2O$. The excess $CdCl_2 \cdot 2H_2O$ is dissolved and large single orthorhombic cadmium stannate crystals are recovered which have a conductivity of more than about 10 ohm$^{-1}$cm$^{-1}$.

EXAMPLE 5

Crystalline cadmium stannate powder with a conductivity of 10 ohm$^{-1}$cm$^{-1}$ is deposited on an aluminum sputtering target. The target is mounted in a standard radiofrequency sputtering chamber and a glass substrate is placed underneath the cadmium stannate target on a water cooled platform at a distance of about 2 inches. The chamber is provided with an atmosphere of 100 percent argon at 10$\mu$Hg pressure, and the cadmium stannate is sputtered onto the cold glass substrate at a power level of 200 watts for 1 hour. The resulting film of amorphous cadmium stannate is 0.35 $\mu$ thick with a sheet resistance of 72 ohms/square and a bulk conductivity of 400 ohm$^{-1}$cm$^{-1}$. The transmissivity of the film is greater than 85 percent over the wavelength range of 7,500 to 4,500 A. It has a mobility of 20 cm$^2$/volt-sec., a free carrier density of $1.23 \times 10^{20}$cm$^3$, a Hall co-efficient of 0.051 cm$^2$/volt., and an apparent optical band gap of 2.85 eV.

EXAMPLE 6

The same procedure is followed as in Example 5 except that the chamber is provided with an atmosphere of 50% Ar 50% $O_2$ at a pressure of 10$\mu$ Hg and the cadmium stannate is sputtered onto the cold substrate at a power level of 700 watts for 6 hours. The resulting film of amorphous cadmium stannate is 2.9$\mu$ thick, and has a sheet resistance of 35,600 ohms/square and a bulk conductivity of $10^{-1}$ohm$^{-1}$cm$^{-1}$. The transmissivity of the film is greater than 85 percent over the wavelength range of 0.6 to 30$\mu$. It has an electron mobility of 6 cm$^2$/volt sec., a free carrier density of $1.00 \times 10^{17}$cm$^{-3}$ and an optical band gap of 2.06 eV.

EXAMPLE 7

An amorphous cadmium stannate film 3.3$\mu$ thick as prepared in Example 6 is heated in $H_2$ at about 280°C. for 10 minutes. The resulting film had a sheet resistance of 2.3 ohms/square, a bulk conductivity of 1,330 ohm$^{-1}$cm$^{-1}$, and an apparent optical band gap of 2.51 eV.

EXAMPLE 8

The same procedure as followed in Example 5 wherein polycarbonate is substituted for glass as a substrate.

EXAMPLE 9

The same procedure as followed in Example 6 wherein polymethylmethacrylate is substituted for glass as a substrate.

EXAMPLE 10

The same procedure as followed in Example 7 wherein the substrate is polyimide which is stable at a temperature of 250°C.

EXAMPLE 11

The same procedure as followed in Example 5 wherein the substrate is heated to about 475°C. The resultant film of cadmium stannate is in the cubic crystalline form.

EXAMPLE 12

The product prepared by the procedure of Example 5 in the form of an amorphous film of cadmium stannate on a quartz substrate is heated in air at 700°C. for 1 hour. The resultant film of $Cd_2SnO_4$ is in the cubic crystalline form.

EXAMPLE 13

A light-transmitting electrically conducting film of cadmium stannate is formed on a transparent plastic substrate by the procedure described in Example 10. A 25$\mu$ layer of CdS is then deposited on the cadmium stannate layer by a conventional vacuum evaporation procedure. This is followed by vacuum evaporation on the CdS layer of a copper film 5,000 A. thick. The sandwich is then heat treated at 250°C. for 2 minutes to form the n-type semiconductor-metal junction. Electrical ohmic contacts are then made to the cadmium stannate front electrode and the copper back electrode by using solderable silver epoxy paste. Illumination of the transparent plastic substrate and cadmium stannate electrode with sunlight generates 0.5 volts between the two electrodes.

EXAMPLE 14

A copper layer 1,000 A. thick is vacuum evaporated onto a metallized polyimide substrate. A 25$\mu$ layer of CdS is then vacuum evaporated onto the copper layer. A light-transmitting electrically conducting cadmium stannate film is then formed on the CdS surface by the procedure described in Example 10. Electrical ohmic contacts are made to the cadmium stannate and metal electrodes by using solderable silver epoxy. Illumination of the cadmium stannate transparent electrode with sunlight generates a voltage of 0.5V between the metal and cadmium stannate electrodes.

The foregoing example of a light-transmitting electrically conducting article, as shown in FIG. 2 and as described hereinbefore, are subject to considerable modification. As an example, an electroluminescent device may be constructed by sandwiching an electroluminescent p-n or semiconductor-metal junction between at least two electrodes, one being $Cd_2SnO_4$ in the form of a transparent electrode film. When an electrical potential is generated across the two electrodes the resulting electrically induced radiation is allowed to pass through the transparent cadmium stannate electrode.

As a further example, a photoconducting device may be constructed by sandwiching a photoconductive material between at least two electrodes, one being $Cd_2SnO_4$ in the form of a transparent electrode film, in which the photoconductive material is immediately adjacent to the $Cd_2SnO_4$ electrode, the incident radiation passing through the transparent $Cd_2SnO_4$ electrode layer, being absorbed in the photoconducting material, and lowering the resistance between the two electrodes.

I claim:

1. A new composition of matter, transmissive to light and electrically conductive, the same being $Cd_2SnO_4$ having a conductivity of at least about $10^{-1}ohm^{-1}cm^{-1}$ at 25°C.

2. The $Cd_2SnO_4$ of claim 1 having a conductivity ranging up to about $10^4ohm^{-1}cm^{-1}$ at 25°C.

3. The $Cd_2SnO_4$ of claim 1 disposed on a supporting member as an amorphous film.

4. The $Cd_2SnO_4$ of claim 3 wherein said film has a conductivity ranging up to about $10^4ohm^{-1}cm^{-1}$ at 25°C.

5. The $Cd_2SnO_4$ of claim 1 disposed on a supporting member as a crystalline film.

6. The $Cd_2SnO_4$ of claim 1 having an orthorhombic crystalline structure.

7. The $Cd_2SnO_4$ of claim 1 in the form of a large single crystal.

8. $Cd_2SnO_4$ having a cubic spinel crystalline structure.

9. An electrically conductive light transmitting article which comprises $Cd_2SnO_4$ having the composition of claim 1 in the form of an n-type defect semiconductor disposed as an amorphous film on a supporting member characterized by having a specific resistive transmittance of greater than 15 percent for radiation of wavelength between 4,500 and 10,500 A.

10. $Cd_2SnO_4$ having the composition of claim 1 in the form of an n-type semiconductor disposed on a supporting member as a crystalline film having the property of being both electrically conductive and transparent to visible and near infra-red radiation, and characterized by having a specific resistive transmittance of greater than 15 percent for radiation of wavelength between 4,500 and 10,500 A.

11. A process for depositing a crystalline film of $Cd_2SnO_4$ transmissive to light on a supporting member which comprises:

1. forming a sputtering target from $Cd_2SnO_4$ powder;
2. placing the $Cd_2SnO_4$ target and a substrate on which $Cd_2SnO_4$ is to be deposited in a sputtering chamber containing an inert gas-$O_2$ mixture;
3. maintaining the substrate at a temperature above about 425°C.; and
4. sputtering the $Cd_2SnO_4$ onto the substrate to obtain a crystalline film having a conductivety of at least about $10^{-1}ohm^{-1}cm^{-1}$ at 25°C.

12. $Cd_2SnO_4$ disposed on a supporting member as a film transmissive to light having a conductivity ranging from $10^{-1}ohm^{-1}cm^{-1}$ to $10^4ohm^{-1}cm^{-1}$ at 25°C.

13. A microcrystalline powder which comprises electrically conductive $Cd_2SnO_4$ having a conductivity of at least about $10^{-1}ohm^{-1}cm^{-1}$ at 25°C.

14. A process for depositing an amorphous film of $Cd_2SnO_4$ on a supporting member which comprises:

1. forming a sputtering target from $Cd_2SnO_4$ powder;
2. placing the $Cd_2SnO_4$ target and a substrate on which $Cd_2SnO_4$ is to be deposited in a spluttering chamber containing an inert gas-$O_2$ mixture;
3. maintaining the substrate at a temperature below 425°C.; and,
4. sputtering $Cd_2SnO_4$ onto the substrate whereby an amorphous film having a conductivity of at least about $10^{-1}ohm^{-1}cm^{-1}$ is obtained.

15. The process of claim 14 wherein said inert gas concentration ranges from 100 to 0 percent by volume of said mixture whereby said film is made semiconductive.

16. The process of claim 14 for forming a crystalline film of $Cd_2SnO_4$ on a supporting member which comprises the additional step of heat treating an amorphous film of $Cd_2SnO_4$ at a temperature above about 700°C.

17. The process of claim 14 for forming an electrically conductive, light transmissive film of $Cd_2SnO_4$ on a supporting member which comprises the additional step of heating a supported film of $Cd_2SnO_4$ in a reducing environment at 100° to 500°C. for a period of from 1 minute to 1 hour.

18. A solar cell device comprising a photovoltaic p-n or semiconductor-metal junction sandwiched between at least two electrodes, one being $Cd_2SnO_4$ in the form of a transparent electrode film having a conductivity of at least $10^{-1}ohm^{-1}cm^{-1}$ in which the active junction components are immediately adjacent to the $Cd_2SnO_4$ electrode, the incident solar radiation passing through said transparent $Cd_2SnO_4$ electrode layer being absorbed in the active junction region of the solar cell and generating an electrical potential between the $Cd_2SnO_4$ electrode and the second electrode.

19. An electroluminescent device comprising an electroluminescent p-n or semiconductor-metal junction sandwiched between at least two electrodes, one being $Cd_2SnO_4$ in the form of a transparent electrode film having a conductivity of at least about $10^{-1}ohm^{-1}cm^{-1}$ at 25°C., in which the active junction components are immediately adjacent to said $Cd_2SnO_4$ electrode, the electrical excitation being applied across the two electrodes and the resulting electrically induced radiation passing through the transparent $Cd_2SnO_4$ electrode.

20. A photoconducting device comprising a photoconductive material sandwiched between at least two electrodes, at least one of said electrodes being $Cd_2SnO_4$ in the form of a film transparent to incident radiation in which the photoconductive material is contiguous to said $Cd_2SnO_4$ electrode whereby the incident radiation passing through said transparent $Cd_2SnO_4$ electrode layer is absorbed in said photoconductive material thereby lowering the resistance between said two electrodes, said $Cd_2SnO_4$ having a conductivity of at least about $10^{-1}ohm^{-1}cm^{-1}$ at 25°C.

21. A electrically heatable transparent article comprising an insulating, transparent supporting member which is coated with $Cd_2SnO_4$ having at least two cooperative electrical contacts separated from each other by said coating whereby an electrical current can be passed through the conductive $Cd_2SnO_4$ layer and thereby becomes capable of generating heat, said $Cd_2SnO_4$ having a conductivity of at least about $10^{-7}ohm^{-1}cm^{-1}$ at 25°C.

* * * * *